United States Patent [19]
Brock

[11] 3,894,607
[45] July 15, 1975

[54] CLAMPING APPARATUS FOR A PLURALITY OF BATTERIES

[76] Inventor: James E. Brock, P.O. Box 53, Cathlamet, Wash. 98612

[22] Filed: Nov. 15, 1972

[21] Appl. No.: 306,914

[52] U.S. Cl. .............................. 180/68.5; 248/361
[51] Int. Cl. ............................................ B60r 18/02
[58] Field of Search ...... 180/68.5; 105/51; 136/171, 136/173; 248/361

[56] References Cited
UNITED STATES PATENTS

| | | | |
|---|---|---|---|
| 1,146,806 | 7/1915 | Manson | 136/173 |
| 1,382,980 | 6/1921 | Hunt | 180/68.5 |
| 2,480,202 | 8/1949 | Stassen | 180/68.5 |
| 2,548,256 | 4/1951 | Deo | 180/68.5 |
| 2,653,988 | 9/1953 | Rupp | 180/68.5 X |
| 2,833,363 | 5/1958 | Henehan | 180/68.5 |
| 2,918,983 | 12/1959 | Maitland et al. | 180/68.5 |
| 3,557,895 | 1/1971 | Thomas | 180/68.5 |

*Primary Examiner*—Leo Friaglia
*Assistant Examiner*—David M. Mitchell

[57] ABSTRACT

This invention is for a clamping apparatus for a plurality of batteries so as to hold the batteries in place. This invention makes it relatively easy to remove the clamping apparatus so as to be able to remove one or more batteries and replace the batteries. In practicing this invention it is necessary to remove, only, one nut. The nut can be loosened on a rod so as to remove a bearing member which bears on the batteries. Then the battery can be removed and replaced.

2 Claims, 15 Drawing Figures

FIG. 3

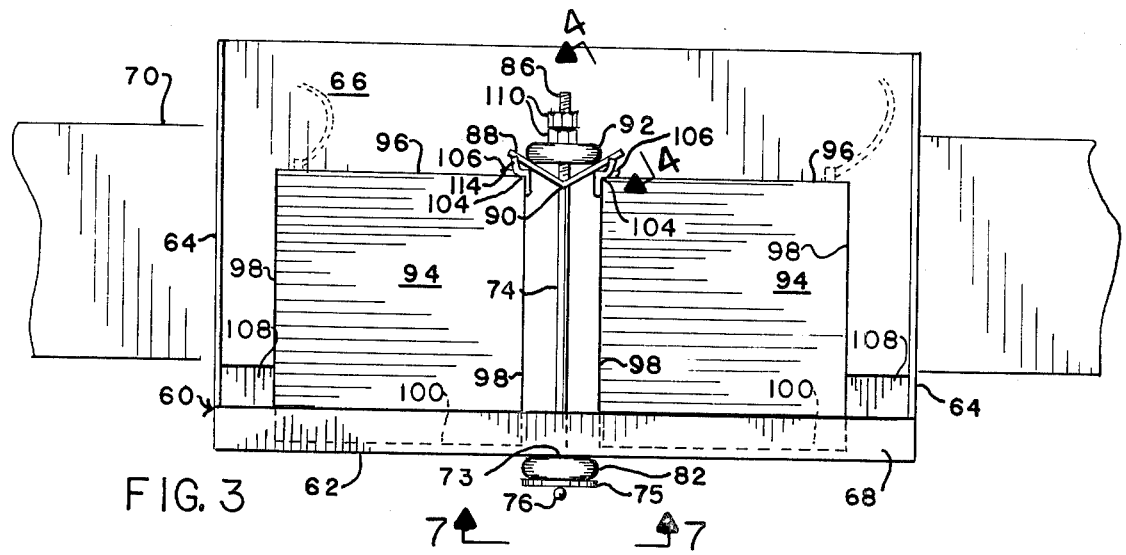
FIG. 3
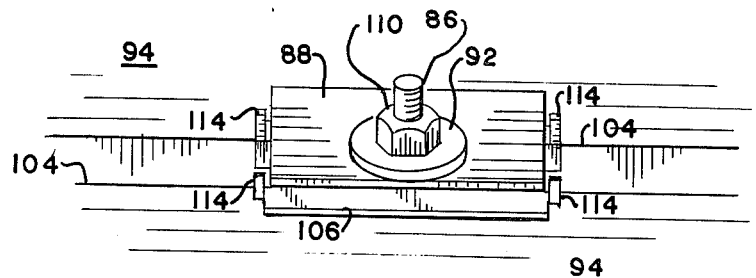
FIG. 4
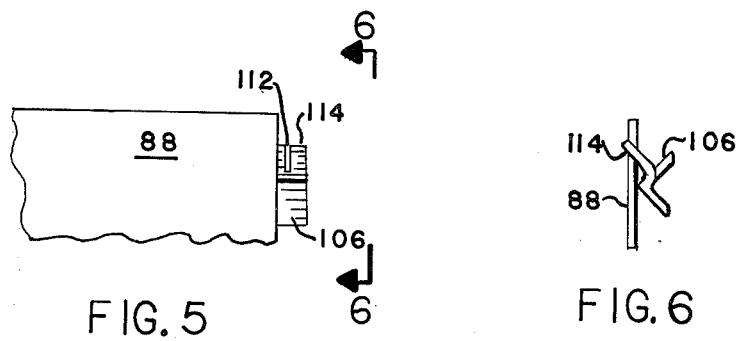
FIG. 5
FIG. 6

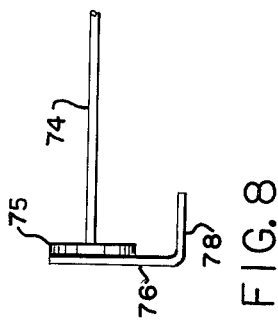
FIG. 8
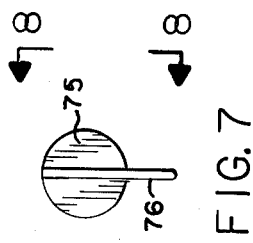
FIG. 7
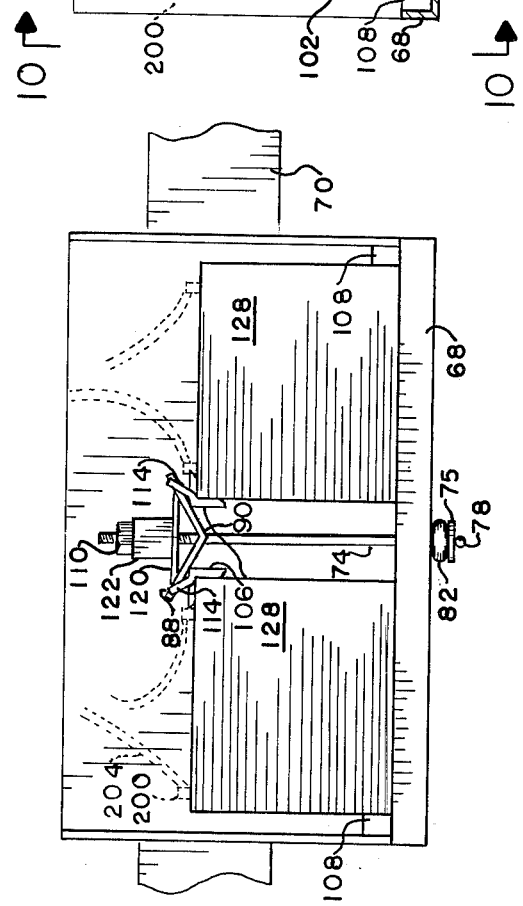
FIG. 9
FIG. 10

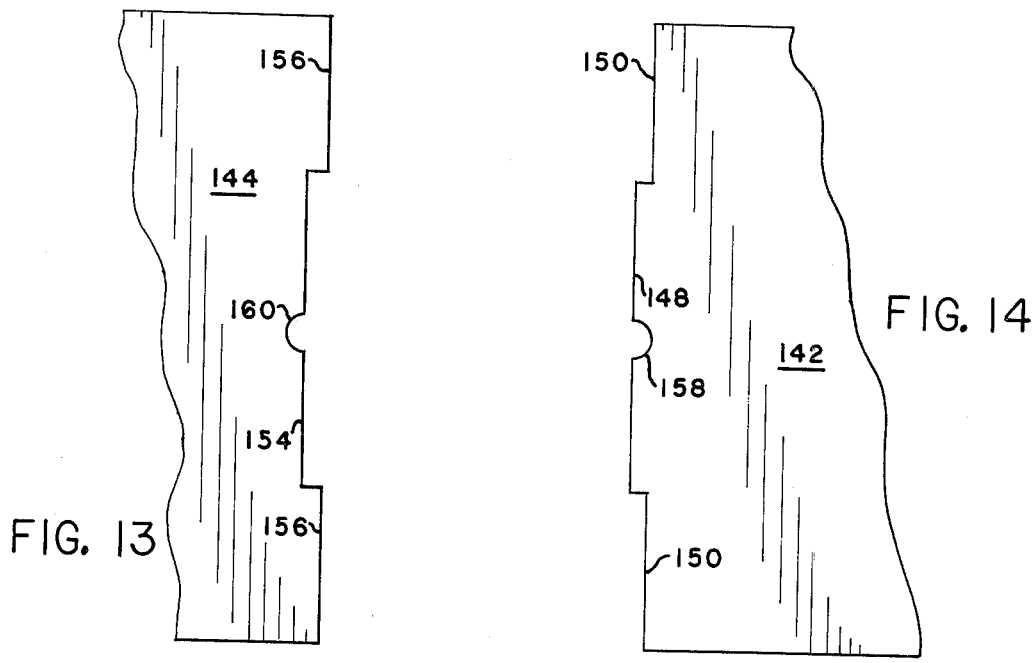
FIG. 13
FIG. 14
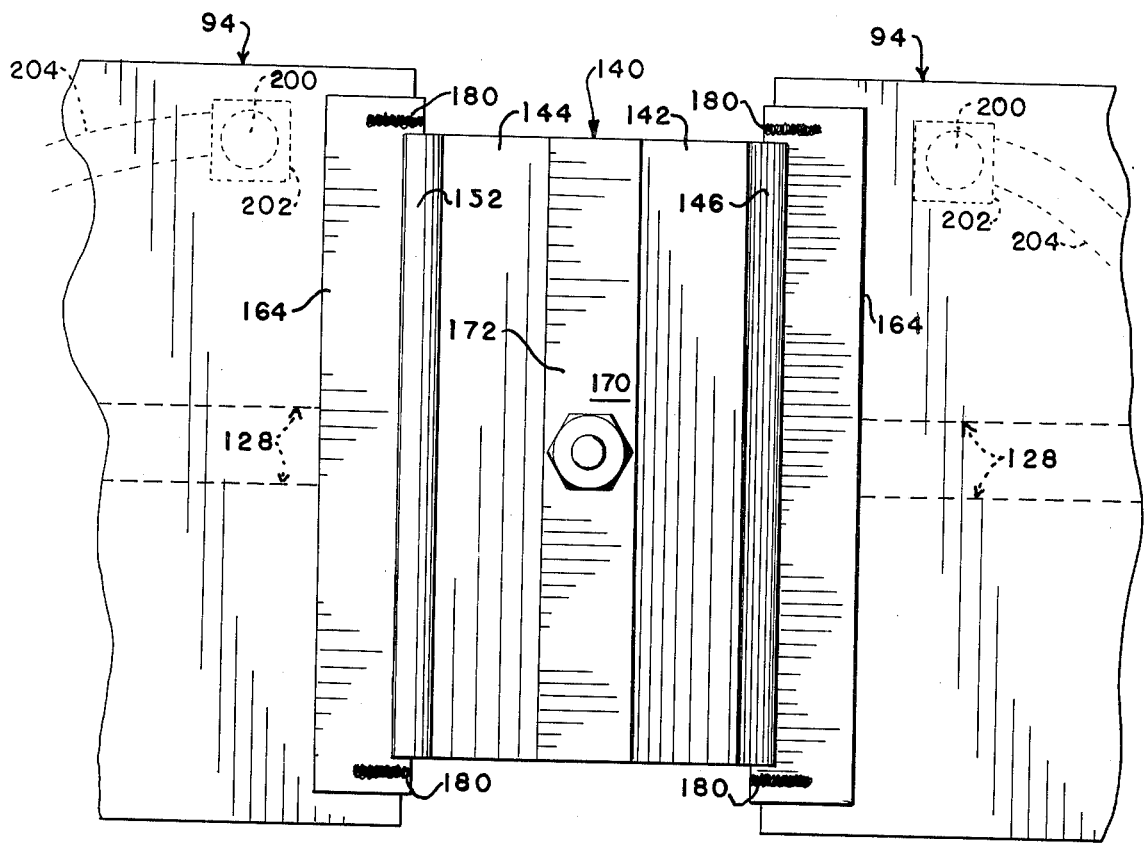
FIG. 15

CLAMPING APPARATUS FOR A PLURALITY OF BATTERIES

In many automotive vehicles there are a plurality of chemical electrical storage batteries. For example, in automotive vehicles having diesel engines there may be two 12 volt batteries, in parallel, or four 6 volt batteries arranged in parallel and in series. The 12 volt batteries will weigh as much as 150 pounds each. The batteries are positioned in a battery box and there is a battery hold down device. One of the hold down devices comprises four combinations of bolts and nuts. Or, there are four bolts and four nuts attached to a frame for holding the battery in the battery box. As is well known a lead storage battery contains a corrosive aqueous solution of sulphuric acid. Some of the sulphuric acid escapes from the interior of the battery and splashes onto the rods or nuts and bolts. Further, there are fumes from the truck which contact the nuts and bolts. The corrosive sulphuric acid and the fumes from the engine tend to corrode the nuts and bolts. If the batteries have been in place for a year or two years the corrosion may be fairly extensive. If one cell in a battery or the batteries decrease in the storage capacity it is necessary to remove the frame around the battery and to remove the nuts and bolts. Since there are four nuts and bolts, and the nuts and bolts have been corroded together, and the position for working on the batteries in the truck is a rather inconvenient position, it may take considerable time to loosen these nuts and bolts and to remove the frame. For example, in certain difficult installations I have spent as much as 2 hours in removing the four nuts and bolts, removing the frame, taking out the batteries, inserting new batteries into the battery box, replacing the frame and screwing the nuts onto the bolts. Naturally, someone is paying my wages during this 2 hour period. The cost of replacing the batteries in a battery box, for a large fleet of trucks or automotive vehicles, can be expensive.

In regard to the difficulty of removing the batteries under the older conventional apparatus the reader is referred to FIGS. 1 and 2 wherein it is shown that a frame member 20 of the truck comprises support for the battery box. The battery box comprises a bottom shelf 22, a side 24. The side 24 is attached to the frame member 20. Then, there are upright sides 26 and 28 which may be considered to be extensions, at right angles, to the side member 24. Then, there is a short side member 30 or end member 30. The end member 30 runs between the sides 26 and 28. The end wall 30 is a barricade for the batteries moving out of the battery box. It may be approximately 1 inch in height. In addition to a barricade for the batteries moving out of the battery box it is of a low height so that a person removing the batteries from the battery box can lift the batteries over the top of the end wall 30.

In FIGS. 1 and 2 it is seen that there is a battery hold down frame 32. The battery hold down frame 32 may comprise a top rim 34 and a side rim 36. The top rim fits over the top of the batteries and the side rim fits over the top edges of the batteries. The width of the top rim 34 may be, approximately, 2 inches, and the height of the side rim 36 may be, approximately, 2 inches. The battery hold down member 32 may be of metal or Fiberglas reinforced with resin or resin reinforced Fiberglas. There is attached to the side walls of the battery hold down member 32 four hollow tubes 38.

In the bottom member 22 there are four passageways 40. A long rod 42 projects through each passageway 40 with the head of the rod 44 underneath the member 22. The upper end of the rod 42 is threaded at 46 and projects through the tubes 38. A nut is screwed over the top of the rod 42. The nut 48 firmly positions the frame onto the upper part of the batteries.

Again, in FIGS. 1 and 2 it is seen that there may be positioned in the battery box two batteries 50. The two batteries 50 may be two 12 volt batteries and weighing, approximately 150 pounds each. Some operators of automotive vehicles such as trucks having diesel engines prefer to use, in place of two 12 volt batteries, four 6 volt batteries. In this instance, there may be four 6 volt batteries 50 and these are indicated by the phantom lines 52 in FIG. 2.

From this description of a battery hold down unit as formerly used on automotive vehicles it is seen that the nuts and bolts 48 and 46 can be corroded together by the sulphuric acid from the battery and also the fumes from the truck. After standing for 1 or 2 years, it may be very difficult to break the corrosive seal between the nuts and bolts. As I stated formerly I have spent as much time as 2 hours in breaking the seals between the nuts and bolts, removing the battery hold down member 32 from over the tops and sides of the batteries, removing the batteries from the battery box and replacing the batteries in the battery box, positioning the battery hold down member 32 over the sides and tops of the new batteries, and then tightening the nuts 48 on the threaded ends 46 of the bolt or rod 42 so as to firmly position the battery hold down member 32 and the batteries 50 and 52 in place. More particularly, with the fumes of the sulphuric acid, and some of the sulphuric acid, and also fumes from the engine the rods 42 in the tubes 38 become so tightly worked together it is as if the tube 38 and the rod 42 are one member. The corrosive fumes and also the corrosive sulphuric acid work in the tube and against the surface or against the rod 42. It is as if the rod 42 and the tube 38 are corroded or fused member. The breaking loose of the rod 42 from the tube 38 becomes a major undertaking, is frustrating, time consuming and expensive. With this in mind I have invented the subject invention.

In the conventional frame the batteries are relatively tightly packed so that movement is restricted. Even though movement is restricted in the conventional frame it is possible for the batteries to move in two directions on the shelf of the battery holder. It is possible for the batteries to move in two directions, substantially, at right angles to each other. Further, if a metal frame is used the battery cables can rub against the metal frame and, possibly short out. From having worked on trucks and automotive vehicles using a diesel engine and storage batteries, I have seen battery cables which have rubbed against the frame for holding the batteries and the insulation has been worn through so that the battery cables can short out on the frame.

Also, with the conventional frame for holding a battery it is necessary to disconnect the battery cables from the battery in order to remove the frame from around the upper part of the battery. If it be necessary to replace one battery, out of two batteries, it is necessary to disconnect the cables from the batteries and then remove the frame.

From, physically, having worked with automotive vehicles and having changed batteries and encountered the exasperation and frustration involved in the changing of batteries and with this background I have made the present invention. Accordingly, an object of this invention is to provide a battery clamping apparatus for holding down a plurality of batteries and which apparatus is of a simple construction and design; a further object is to provide such an apparatus which saves time in changing batteries so as to replace a defective battery with a good battery; another important object is to provide such an apparatus which is effective in positioning batteries so as to restrict the slight movement of the batteries to a movement in one direction instead of a movement in two directions, substantially, at right angles to each other; another object is to provide such an apparatus whereby there is less chance that the battery cable will short out on the housing for holding the batteries; a further object is to provide such an apparatus which makes it possible to remove the batteries without disturbing the battery cables thereby making it possible to remove the batteries without disconnecting the battery cables from the batteries; and, another important object is to provide such an apparatus which has a low initial cost and is not prone to being damaged, partially because of its simple construction and manner of use.

These and other important objects and advantages of the invention will be more particularly brought forth upon reference to the accompanying drawings, the detailed description of the invention and the appended claims.

IN THE DRAWINGS

FIG. 3 is a specific embodiment of one form of battery holder constructed in accordance with the teachings of this invention;

Figure 11:
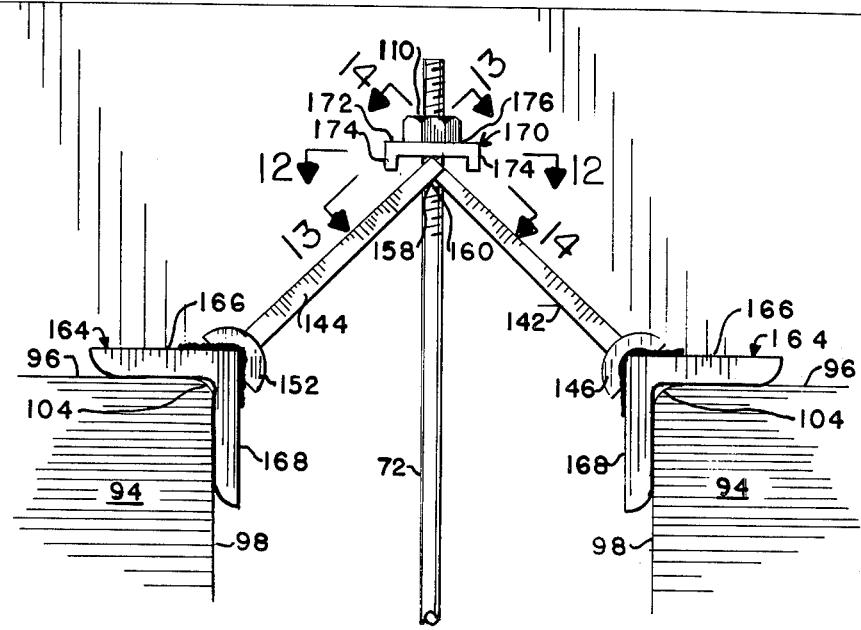
Figure 12:
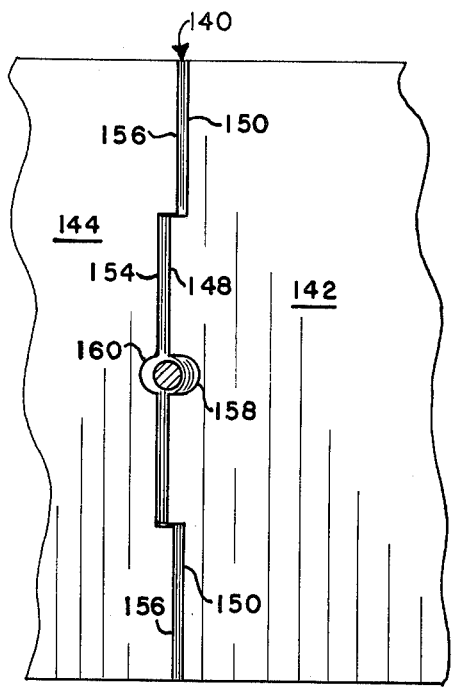

FIG. 4, taken on line 4—4 of FIG. 3, is a fragmentary view illustrating one detail of construction of the battery holder;

FIG. 5, on an enlarged scale, is a fragmentary view illustrating one feature of the battery holder for preventing movement of a V-shaped means for forcing an angular bearing member against the top and sides of the battery;

FIG. 6, taken on line 6—6 of FIG. 5, is an end view illustrating a detail of construction for preventing movement of the angular bearing member and the V-shaped means with respect to each other;

FIG. 7, taken on line 7—7 of FIG. 3, is a bottom plan view illustrating part of the hold down system for the battery;

FIG. 8, taken on line 8—8 of FIG. 7, is a side elevational view illustrating the rod and the hook for assisting in holding down the battery;

FIG. 9 is a side elevational view of a modification of the invention and illustrates means for holding four batteries;

FIG. 10, taken on line 10—10 of FIG. 9, is an end elevational view;

FIG. 11 is an end elevational view of another species of the invention and illustrates the means for holding batteries in place in a battery box;

FIG. 12, taken on line 12—12 of FIG. 11, is a horizontal cross sectional view illustrating the means, i.e., two plates to assist in holding batteries in position in the battery box;

FIG. 13, taken on line 13—13 of FIG. 11, is an angular cross sectional view illustrating the upper end of one plate;

FIG. 14, taken on line 14—14 of FIG. 11, is an angular cross sectional view illustrating the upper end of second plate used in holding the batteries in position; and, FIG. 15 is a plan view looking down on FIG. 9 and illustrates the means for holding batteries in place in the battery box and, illustrates by broken lines, four batteries in a battery box.

In FIGS. 3–8 there is illustrated one species of the invention. It is seen that there is a battery box 60 comprising a bottom shelf 62, sides 64, a back 66, and a lower front wall 68. The lower front wall 68 can be approximately 1 inch or 2 inches in height.

The battery box 60 is attached to a frame member 70 of the truck or automotive vehicle.

In the bottom shelf 62 there is a passageway 72. A rod 74 projects up through the passageway 72.

In FIGS. 3, 7, 8 and 9 the construction of the rod is more particularly illustrated. The rod 74 connects with a disc 75. The rod 74 connects with the upper surface of the disc 75. There is attached to the lower surface of the disc 75 an arm 76 which bends upwardly into a hook 78. The hook 78 is substantially parallel to the rod 74. In FIG. 9 it is seen that in the bottom shelf 62 there is a passageway 80. The hook 78 projects into the passageway 80.

Also in FIGS. 3, 9 and 10 it is seen that there is positioned between the upper surface of the disc 75 and the lower surface of the shelf 62 a resilient, yielding means 82. The resilient yielding means 82 may be a rubber bushing or a plastic bushing. For example, the rod 74 passes through a passageway in the bushing or O-ring 82. The O-ring 82 may be of rubber which is resistant to petroleum products such as oils, greases and gasoline. Or, the O-ring 82 may be of a suitable plastic such as urethane, polyethylene, nylon or tetrafluropolyethylene. The O-ring 82 should be resilient and yielding so that it can be squeezed between the upper surface of the disc 75 and the lower surface of the bottom shelf 62. The O-ring 82 absorbs some shock when the automotive vehicle rides over a rough or irregular surface in the road.

The upper end of the rod 74 is threaded at 86.

There is a V-shaped means or member 88. In the member 88 there is a passageway 90. The rod 74 projects through the passageway 90. There is positioned on the rod 90, above the V-shaped member 88, an O-ring or bushing 92. The O-ring 92 is, also, of rubber such as a rubber resistant to petroleum products like oils, grease and gasoline, or a polyurethane material, polyethylene, nylon or tetrachlorolpolyethylene.

In the first form of the invention the lower surfaces of the V-shaped member bore directly against the batteries 94.

An electric storage battery having a chemical solution such as a lead and sulphuric acid battery is, generally, of a rectangular parallelopiped configuration. In FIG. 3 it is seen that the battery has a top surface 96, sides 98 and a bottom surface 100. At the ends there are end walls or end surfaces 102.

At the junction of the top surfaces, surface 96 and the side wall 98 there is an edge 104.

As previously stated, in the original form of the invention the lower surface of the V-shaped member 88 bore directly against the edges 104 of the battery 94. It was decided to place an angular bearing member 106 between the lower surface of the member 88 and the edge 104 of the battery 94. The angular bearing member 106 may be an angle iron. The angle iron 106 may be connected with the underneath surface of the V-shaped member 88. The angular bearing member 106 may be metal or a molded or extruded plastic. In FIGS. 3 and 4 it is seen that the V-shaped member 88 contacts two adjacent edges 104 of two adjacent batteries 94.

In actual practice there may be two twelve volt batteries 94 connected in parallel. These batteries 94 are positioned in the battery box 60. A 2 inch × 2 inch or a 2 inch × 4 inch, 108 may be positioned between the outside walls 98 of the batteries 94 and the side walls 64 of the battery box 60. The rod is projected through the passageway 72 in the lower surface 62 with the hook end 78 in the hole 80. This definitely positions the rod with respect to the battery box 60. As is recalled the O-ring 82 is positioned between the disc 75 and the lower surface of the bottom shelf 62. Then, the rod projects through the passageway 90 in the V-shaped member 88. An O-ring 92 is positioned above the V-shaped member 88 and the nuts 110 are screwed onto the threaded end 86 of the rod 74. The nuts are tightened so as to squeeze the O-ring 82 out of its normal configuration and also to squeeze the O-ring 92 out of its normal configuration. In fact, the two O-rings 82 and 92 are squeezed to be relatively flat and of a generally elliptical configuration. The two O-rings 82 and 92, by way of recall are resilient and yielding. This means that there is flexibility imparted to the positioning of the batteries 94 in the battery box 60. Also, it is seen that the batteries 94 are so positioned in the battery box 60 that they can move, at the least, in only one direction.

The ends of the angular bearing 106 are cut at 112 and then one end is bent at an angle 114. This means that the V-shaped member 88 cannot slide past the end of the angular bearing member 106. In other words, the bent portion 114 functions as a lock on the movement of the V-shaped member 88.

In FIGS. 9 and 10 there is illustrated a modification of the invention of FIGS. 3–8. In this modification there are four batteries instead of two batteries as illustrated in FIG. 3. In FIG. 3 there were illustrated two 12 volt batteries while in FIGS. 9 and 10 there is illustrated four 6 volt batteries. The batteries in FIGS. 9 and 10 comprise two pairs of batteries and each pair of batteries having two batteries or two units. In a pair of batteries the batteries are in a side-by-side relationship. When one pair of batteries is positioned next to another pair of batteries the juxtapositioned batteries in the two adjacent pairs of batteries are in an end-to-end relationship. The means for holding a pair of batteries in position is the V-shaped member 88. Since there are two pairs of batteries, in an end-to-end relationship, there is required two V-shaped members 88. Also, there is required only one rod 72. The V-shaped members 88 are modified, see FIG. 10. The modification comprises a round rod 120 which is welded to the upper surfaces of the member 88.

As is seen in FIGS. 9 and 10 there is a strong back 122 having a central passageway 124. The strong back 122 comprises, essentially, a bar which in a lateral cross sectional configuration may be of a square configuration or a rectangular configuration. The length of the strong back 122 is sufficient to extend over the round rod 120 of the two adjacent V-shaped members 88.

In FIG. 9 it is seen that the hook 78 projects through the opening 80 in the bottom shelf 62 and that the rod extends through the opening 72 in the bottom shelf 62 and upwardly so as to extend through the passageway 124 and the strong back 122. The nut 110 is screwed onto the threaded end 86 of the rod 72. The nut can be screwed down so tightly as to force the strong back 122 against the plates 120 so as to force the angular bearing members 106 against the edges 104 to the 6 volt batteries 128. Again, there is a resilient yielding O-ring 82 between the disc 74 and the bottom surface of the bottom shelf 62. This O-ring 82 provides the cushioning effect.

From the foregoing it is seen that there has been provided a clamping apparatus for a plurality of batteries and which clamping apparatus makes it possible to firmly position the batteries in a battery box. The batteries may be two 12 volt batteries in a side-by-side relationship or may be four 6 volt batteries in a side-by-side and end-to-end relationship.

If one of the batteries needs to be replaced one nut can be unscrewed from the rod 72 so as to remove the V-shaped member 88 and, when applicable, the strong back 122. Then, the batteries can be lifted and moved over the low end wall 68. Conversely, new batteries can be lifted over the end wall 68 and moved into position in the battery box 60. The V-shaped members 88 and, when applicable, the strong back 122 can be adjusted into position and the nut 110 tightened onto the upper threaded end of the rod 72. The time required to loosen the nut 110, replace the batteries, and tighten the nut 110 is not over one-half hour. The nut 110 is in a more applicable position for being moved than the four nuts as illustrated and described in FIGS. 1 and 2. The saving in time is considerable. Further, it is not necessary to disconnect the battery cables from the battery while the batteries, 94 and 128, are in the battery box 60. If, only one battery needs to be replaced, it is not necessary to disconnect all the cables to all the batteries. The clamping means can be loosened and removed, the one battery removed from the battery box 60, the battery replaced, and the clamping means repositioned. The battery which has been removed from the battery box 60 can be loosened from the battery cable outside of the battery box 60. Again, it is not necessary, in replacing one battery to loosen the cable for all of the batteries. This, in itself is a savings in time, and, therefore, a saving in money with respect to maintainance of the batteries for the automotive vehicle.

In FIGS. 11–15 there is illustrated a second clamping apparatus 140.

In FIGS. 11–15 it is seen that the apparatus 140 comprises a first plate 142 and a second plate 144.

The plate 142 on its lower or first end has a semi-circular channel member 146. And, on its upper end has a stepped edge. The central portion of the plate 142 on its upper or second end has an outwardly projecting edge 148, and on each side of 148 a recessed edge 150.

In FIG. 12 it is seen that the projecting edge 148, with respect to the recessed edges 150 projects outwardly and beyond the recessed edges 150.

The plate 144 on its lower or first end has a semi-circular or U shaped channel 152. And, the plate 144 on its upper or second end has a recessed central portion 154 and on each side of 154 an outwardly projecting edge 156. In FIG. 12 it is seen that the edge 154 with respect to the edges 156, is recessed.

In the edge 148 there is a semi-circular recess 158. In the edge 154 there is a semi-circular recess 160. Also, the length of the recessed edge 154 is slightly greater than the length of the outwardly extending edge 148.

In FIGS. 11 and 12 it is seen that the plates 142 and 144, on their upper or second ends, interlock with each other in the fashion of a tongue and groove relationship between the projecting edge 148 and the recessed edge 154; and, between the projecting edges 156 and the recessed edges 150.

On the first end or the lower end of the plates 142 and 144 the semi-circular ends can bear against the upper surface 96 and the sides 98 of the batteries 94 or 128. In practice, however, the ends of the members 146 and 148 will work their way into the relatively soft rubber or plastic cases of the electrical storage batteries. In time, the ends of members 146 and 152 may work their way completely through the cases of the electric storage batteries so as to contact the acid or the plates in the battery and to short out the batteries. Therefore, it is desirable to position an angle member 164 over the corners 104 of the batteries and between the semi-circular members 146 and 152. As is seen in FIG. 11 the angles 164 have a first leg 166 which fit over the top surface 96 of the battery and a lower leg 168 which fits over the side 98 of the battery.

In operation the rod 74 projects through the semi-circular recesses 158 and 160, after the plates 142 and 144 have been positioned with respect to each other and in the tongue and groove relationship, previously, described. Then, there is positioned over the second end or upper end of the plates 142 and 144 a capping strip 170. The capping strip 170 comprises a main base 172 and two downwardly directed legs 174. In FIG. 11 it is seen that the capping strip 170, in an end elevational view, has the general configuration of a U-shaped member.

The capping strip 170 has a passageway 176. The rod 74 projects upwardly through the passageway 176. The nut 110 can be screwed onto the upper end of the threaded rod 74 and tightened so as to force the capping strip 170 against the upper ends of plates 142 and 144. In turn, the lower ends 146 and 152 of the plates 142 and 144 bear against the angle 164 so as to force the angle firmly against the edges 104 of the batteries.

Again, the lower end of the rods 72 connects with the disc 74 which in turn connects with the rod 76 and the hook 78. As illustrated in FIG. 3 and in FIG. 9 the hook 78 projects through an opening 80 in the bottom shelf 62 of the battery box 60. There is the resilient yielding O-ring 82 positioned between the disc 74 and the bottom shelf 62.

In FIG. 15 there is illustrated two batteries 94 in a side-by-side relationship. The angles 164 and the ends 146 and 152 can extend substantially the full length of the batteries 94 so as to firmly position the batteries 94 in the battery box. The batteries 94 may be two 12 volt batteries.

If desired, there may be used four 6 volt batteries 128. In this instance the angles 164 and the ends 146 and 152 extend over substantially the entire length of the batteries 128 so as to firmly bear against the edges 104 of the batteries 128 so as to firmly position these batteries.

The batteries 128, as previously explained, are in two pairs of two batteries each. A pair of batteries comprises two batteries 128 in a side-by-side relationship. Also, two pairs of batteries are such that the batteries in one pair are in an end-to-end relationship with the batteries in the other pair, as previously, explained.

It is seen that on the upper surface of the angle 164, and near the outer edges of the angles 164, are two welded beads 180. The welded beads are stops. More particularly, an automotive vehicle, and one which is used on rough roads such as a logging truck, the angle 164 may tend to move or slide with respect to the batteries and with respect to the plates 142 and 144. In order to preclude the angle 164 from sliding away from being between the ends 146 and 152 and the edges 104 of the battery there is used the welded bead 180. The welded bead limits the travel of the angle 164 with respect to the batteries and also with respect to the plates 142 and 144.

Again, in order to remove a defective battery from the combination of either two or four batteries it is necessary to loosen only one nut from the rod, remove the capping strip, the plates 142 and 144, and the angles 164 and then remove the defective battery or batteries. It is not necessary to disconnect all of the battery cables connecting with the batteries in the battery box. Only those cables connecting with the defective battery need to be disconnected from the batteries. Also, the time required is not over one-half hour as it is not necessary to remove four nuts from four bolts. It is necessary to remove only one nut from one bolt. The saving in time is considerable, over the apparatus and method described with respect to FIGS. 1 and 2, and therefore the saving in money is considerable.

The materials of construction of the plates 142 and 144 are of metal. The angle 164 can be of metal such as a strip of angle iron cut to the appropriate length. It is conceivable that the angle 164 can be of plastic, such as an extruded plastic, cut to the proper length.

Figure 1:
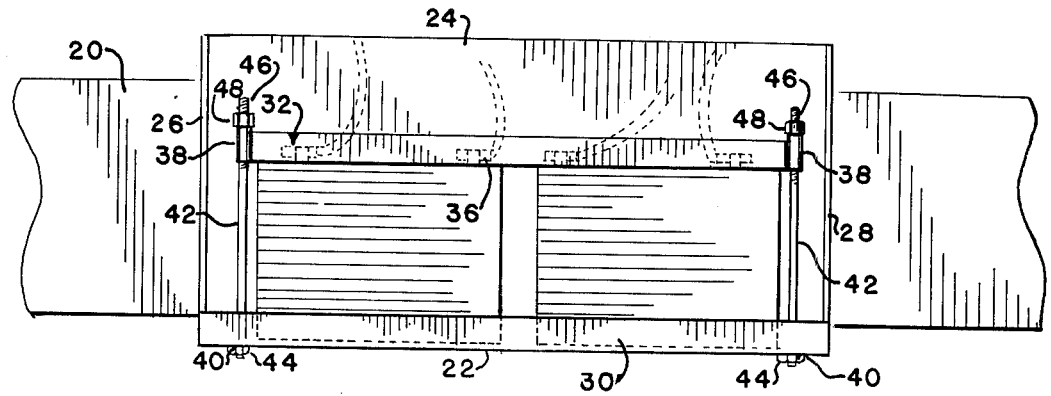
FIG. 1 is a front elevational view illustrating what was a conventional means for holding batteries in a box for batteries and which box was attached to the frame of the truck.
Figure 2:
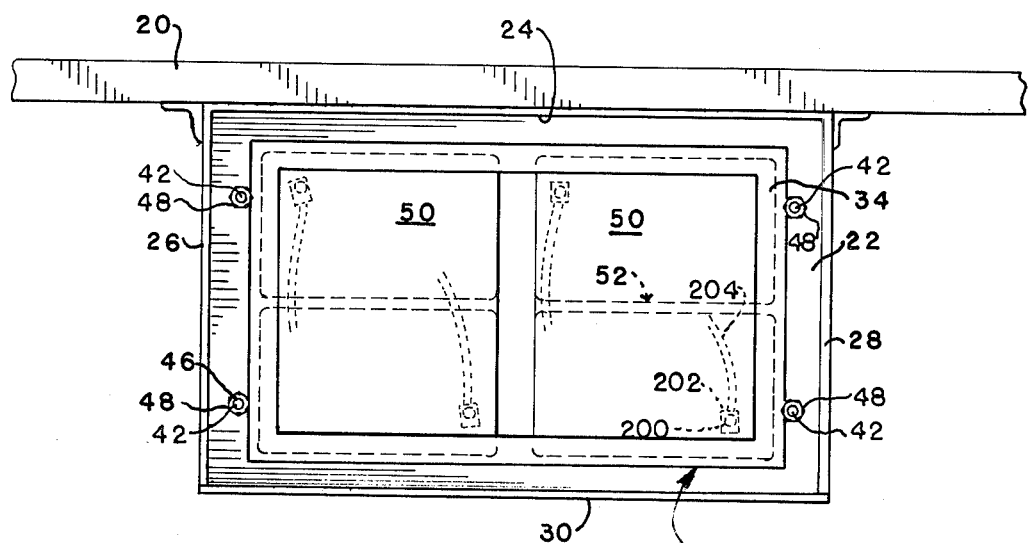
FIG. 2 is a plan view looking at what was once a conventional means for positioning batteries in a box for batteries and which box was attached to the frame of the truck.

In order to not confuse the reader, the battery terminals 200, the battery clamps 202 and the battery cables 204 have been shown in phantom or broken lines. In FIGS. 1 and 2 it is seen that in order to remove the frame 32 it is necessary to remove the battery cables 204 from the battery terminals 200. In FIGS. 3-15 the hold downs 88, 142 and 144 can be removed from the batteries without removing the battery cables 204 from the battery terminals 200.

From the foregoing and having presented my invention with respect to positioning a plurality of batteries, each battery being of a generally rectangular parallelopiped configuration having corners and edges, in a battery box what I claim is:

1. A clamping apparatus for units of a generally rectangular parallelopiped configuration and having corners and edges, said apparatus comprising:
   a. a first shelf;

b. a first means for bearing against adjacent upper edges of two juxtapositioned units and for forcing said units against said first shelf;
c. a second means to prevent movement of said units substantially parallel to said shelf;
d. a first passageway in said first shelf;
e. a rod operatively connecting with said first means;
f. said rod projecting through said first passageway and connecting with said first shelf;
g. a positioning means on said shelf;
h. the end of said rod projecting through said first passageway forming a hook;
i. said hook connecting with said positioning means to firmly position said rod with respect to said shelf; and,
j. a resilient yielding means between that end of the rod defining said hook and the first shelf to absorb some shock.

2. A clamping apparatus for units of a generally rectangular parallelopiped configuration and having corners and edges, said apparatus comprising:
a. a first shelf;
b. a first means for bearing against adjacent upper edges of two juxtapositioned units and for forcing said units against said first shelf;
c. a second means to prevent movement of said units substantially parallel to said shelf;
d. said first means comprising bearing members;
e. V-shaped means having a first leg and a second leg, to force said bearing members against said adjacent edges;
f. a rod operatively connecting with said V-shaped means and operatively connecting with said first shelf;
g. said first means comprising said bearing members, said V-shaped means and said rod;
h. a first passageway in said first shelf;
i. said rod projecting through said first passageway and connecting with said first shelf;
j. a positioning means on said shelf;
k. the end of said rod projecting through said first passageway forming a hook;
l. said hook connecting with said positioning means to firmly position said rod with respect to said shelf;
m. a resilient yielding means between that end of the rod defining said hook and the first shelf to absorb some shock;
n. said bearing members being angular bearing members positioned between said V-shaped means and said adjacent edges; and,
o. said angular bearing members having two surfaces substantially at right angles to each other to fit with the edges of said units.

* * * * *